United States Patent
Twede et al.

(10) Patent No.: US 10,072,970 B1
(45) Date of Patent: *Sep. 11, 2018

(54) HYPERSPECTRAL NOTCH FILTER IMAGING

(71) Applicant: Lockheed Martin Corporation, Bethesda, MD (US)

(72) Inventors: David R. Twede, Orlando, FL (US); Johann M. Veras, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,317

(22) Filed: Dec. 15, 2016

Related U.S. Application Data

(60) Provisional application No. 62/267,693, filed on Dec. 15, 2015.

(51) Int. Cl.
| | |
|---|---|
| *G01J 1/04* | (2006.01) |
| *G01J 1/42* | (2006.01) |
| *G01J 1/44* | (2006.01) |

(52) U.S. Cl.
CPC .............. *G01J 1/0488* (2013.01); *G01J 1/42* (2013.01); *G01J 2001/448* (2013.01)

(58) Field of Classification Search
CPC ....... G01J 1/0488; G01J 2001/448; G01J 1/42
See application file for complete search history.

(56) References Cited

U.S. PATENT DOCUMENTS

| | | | |
|---|---|---|---|
| 8,411,146 B2 | 4/2013 | Twede | |
| 8,462,238 B2* | 6/2013 | Fredembach | ..... H01L 27/14621 348/273 |
| 9,340,446 B1 | 5/2016 | Baleine et al. | |
| 2002/0024653 A1* | 2/2002 | Jung | ................ G01J 3/02 356/73 |
| 2006/0238714 A1* | 10/2006 | Fox | ................ G06K 9/00791 352/49 |
| 2008/0165263 A1* | 7/2008 | Hsu | ................ H01L 27/14621 348/281 |

(Continued)

OTHER PUBLICATIONS

Non-Final Office Action for U.S. Appl. No. 15/380,484, dated Jul. 14, 2017, 18 pages.

(Continued)

*Primary Examiner* — Christine S Kim
(74) *Attorney, Agent, or Firm* — Withrow & Terranova, PLLC

(57) ABSTRACT

An imaging device includes a detector array and an aperture disposed along an optical path, with an array of filter elements disposed in the optical path therebetween. The detector array has a plurality of detector elements that are sensitive to a wavelength spectrum of interest, such as, for example, the visible spectrum and/or the infrared (IR) spectrum. Each filter element is configured to filter out energy within the wavelength spectrum of interest that is in a wavelength band of interest to form filtered energy within the wavelength spectrum of interest that is outside the wavelength band of interest. The filtered energy is passed by each filter to at least one corresponding detector element, which generates one or more detector values based on the received energy. The detector values may be processed to determine an intensity value for the wavelength band of interest.

18 Claims, 11 Drawing Sheets

(56) References Cited

U.S. PATENT DOCUMENTS

| | | | |
|---|---|---|---|
| 2009/0129723 A1* | 5/2009 | Chen | G02B 6/12007 |
| | | | 385/14 |
| 2014/0015932 A1* | 1/2014 | Kim | H04N 13/0257 |
| | | | 348/46 |
| 2014/0307309 A1* | 10/2014 | Downing | G02B 5/285 |
| | | | 359/359 |
| 2015/0138366 A1* | 5/2015 | Keelan | H04N 9/64 |
| | | | 348/164 |
| 2015/0234102 A1* | 8/2015 | Kurzweg | G02B 13/0015 |
| | | | 348/360 |
| 2015/0256801 A1 | 9/2015 | Yamanaka et al. | |
| 2015/0265195 A1* | 9/2015 | Darty | A61B 5/14552 |
| | | | 600/477 |
| 2015/0334357 A1* | 11/2015 | Wang | H04N 9/045 |
| | | | 348/278 |
| 2016/0088242 A1 | 3/2016 | Baleine et al. | |
| 2017/0034456 A1* | 2/2017 | Kyung | H04N 5/332 |
| 2017/0123121 A1* | 5/2017 | Downing | G02B 5/28 |

OTHER PUBLICATIONS

Final Office Action for U.S. Appl. No. 15/380,484, dated Jan. 29, 2018, 16 pages.

* cited by examiner

HYPERSPECTRAL NOTCH FILTER IMAGING

RELATED APPLICATIONS

This application claims the benefit of U.S. Provisional Application No. 62/267,693, filed on Dec. 15, 2015, entitled "HYPERSPECTRAL NOTCH FILTER IMAGING," the disclosure of which is hereby incorporated herein by reference in its entirety for all purposes.

This application is related to U.S. patent application Ser. No. 15/380,484 filed on Dec. 15, 2016, entitled HYPERSPECTRAL NOTCH FILTER IMAGING, filed on the same date herewith and having the same named inventors, the disclosure of which is hereby incorporated by reference in its entirety for all purposes.

TECHNICAL FIELD

Embodiments include a filter for imaging with an imaging device, and, in particular, an imaging device having a notch filter array for hyperspectral notch filter imaging.

BACKGROUND

Detector arrays are made up of a plurality of detector elements that are operable to convert energy, in the form of electromagnetic radiation (EMR), to electrons. Different types of detector arrays operate at different bands of wavelengths. For example, charge-coupled device (CCD) detector arrays and complimentary metal-oxide-semiconductor (CMOS) detector arrays typically operate in the band of visible light. A focal plane array typically operates in an infrared (IR) band of wavelengths. Because each detector element converts any EMR within a particular band of wavelengths to electrons (in the form of current or voltage differences), the detector element by itself cannot identify the receipt of EMR of a particular wavelength or a subset of wavelengths within the band of wavelengths in which the detector element operates.

A color filter, such as a Bayer filter, may be used to identify specific bands of wavelengths received by a detector element. For example, in the context of a point-and-shoot consumer camera, a green filter element may be placed upstream of a detector element to filter out all EMR outside of a green wavelength band. Thus, any EMR received by the respective detector element must be in the green wavelength band. Similarly, a red filter element may filter out all EMR outside of a red band, and a blue filter element may filter out all EMR outside of a blue band. Unfortunately, the approach of filtering out all EMR except a particular band of desired energy reduces the overall energy received by a detector array by as much as 80%. Post-processing algorithms may then be used to construct an image of the scene by determining the intensity and the colors of the scene based only on the energy received that was filtered through the respective filter elements and detected by the corresponding detector elements. Moreover, because each detector element detects only one color, points from the scene are typically blurred to spread energy over a plurality of pixels in each color, resulting in a loss of spatial resolution.

Detector arrays are used in a wide variety of different applications, including consumer applications, forensics, healthcare, industrial, security, and military applications. In some contexts, the spectral information received from a scene by a detector array is used to infer information about the scene, such as the presence of particular objects in the scene. The more energy captured by the detector elements, and the higher the spatial resolution, the greater the likelihood is of identifying objects in the scene. Thus, a methodology that operates by filtering out 80% of the energy received from a scene and that reduces spatial resolution is not an ideal methodology for analyzing the content of a scene.

SUMMARY

Embodiments include a filter for imaging with an imaging device, and, in particular, an imaging device having a notch filter array for hyperspectral notch filter imaging. In one embodiment, an imaging device includes a detector array and an aperture disposed along an optical path, with an array of filter elements disposed in the optical path therebetween. The detector array has a plurality of detector elements that are sensitive to a wavelength spectrum of interest, such as, for example, the visible spectrum and/or the infrared (IR) spectrum. Each filter element is configured to filter out energy within the wavelength spectrum of interest that is in a wavelength band of interest to form filtered energy within the wavelength spectrum of interest that is outside the wavelength band of interest.

The filtered energy is passed by each filter element to at least one corresponding detector element, which generates one or more detector values based on the received energy. The detector values may be processed to determine an intensity value for the wavelength band of interest associated with each particular detector element based on the detector value received from the particular detector element and one or more other detector values received from other detector elements in the detector array.

One advantage of this arrangement is that a larger amount of energy is received by each detector element, because the filter elements (e.g., notch filters) only filter out the particular band of interest for each detector element, while passing most of the remaining energy in the wavelength spectrum of interest. This in turn improves signal-to-noise ratio (SNR), thereby reducing the integration time required to achieve the same effective resolution for a particular wavelength band of interest. Since different detectors measure the same wavelength spectrum of interest with different wavelength bands removed, detector values for groups of nearby detectors can be processed to determine the amount of energy that was filtered out by each filter element. While this may increase complexity of the spectral-image reconstruction, the overall SNR is improved.

Another advantage of this arrangement is that a much larger number of wavelength bands of interest may be measured using a notch filter array or similar array with a particular detector array than can be accurately measured using a conventional bandpass filter array with the same detector array, allowing for improvements in resolution and performance in hyperspectral imaging applications. This is because a particular notch filter element that filters out a particular wavelength band of interest may have a large amount of spectral overlap with adjacent notch filter elements that each filters out a different wavelength band of interest. As a result, it is possible to derive much more information about other wavelength bands within the wavelength spectrum of interest as well as the particular wavelength band of interest being filtered out for a particular detector element.

According to one embodiment, an imaging device is disclosed. The imaging device comprises a detector array comprising a plurality of detector elements sensitive to a wavelength spectrum of interest. The imaging device further comprises a diaphragm forming an aperture, the aperture and the detector array forming an optical path, the aperture configured to pass energy within the wavelength spectrum of interest to the plurality of detector elements of the detector array along the optical path. The imaging device further comprises a filter element positioned in the optical path between the aperture and the detector array. The filter element is configured to filter out energy within a wavelength band of interest within the wavelength spectrum of interest to form filtered energy within the wavelength spectrum of interest outside the wavelength band of interest. The filter element is further configured to pass the filtered energy to a corresponding detector element of the plurality of detector elements.

According to another embodiment, an imaging method is disclosed. The imaging method comprises passing energy in a wavelength spectrum of interest through an aperture. The imaging method further comprises receiving the energy in the wavelength spectrum of interest at a filter element. The imaging method further comprises filtering the energy in the wavelength spectrum of interest through the filter element. Filtering the energy comprises filtering out energy within a wavelength band of interest within the wavelength spectrum of interest to form filtered energy within the wavelength spectrum of interest outside the wavelength band of interest. Filtering the energy further comprises passing the filtered energy through the filter. The imaging method further comprises receiving the filtered energy at a particular detector element of a plurality of detector elements arranged in a detector array.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
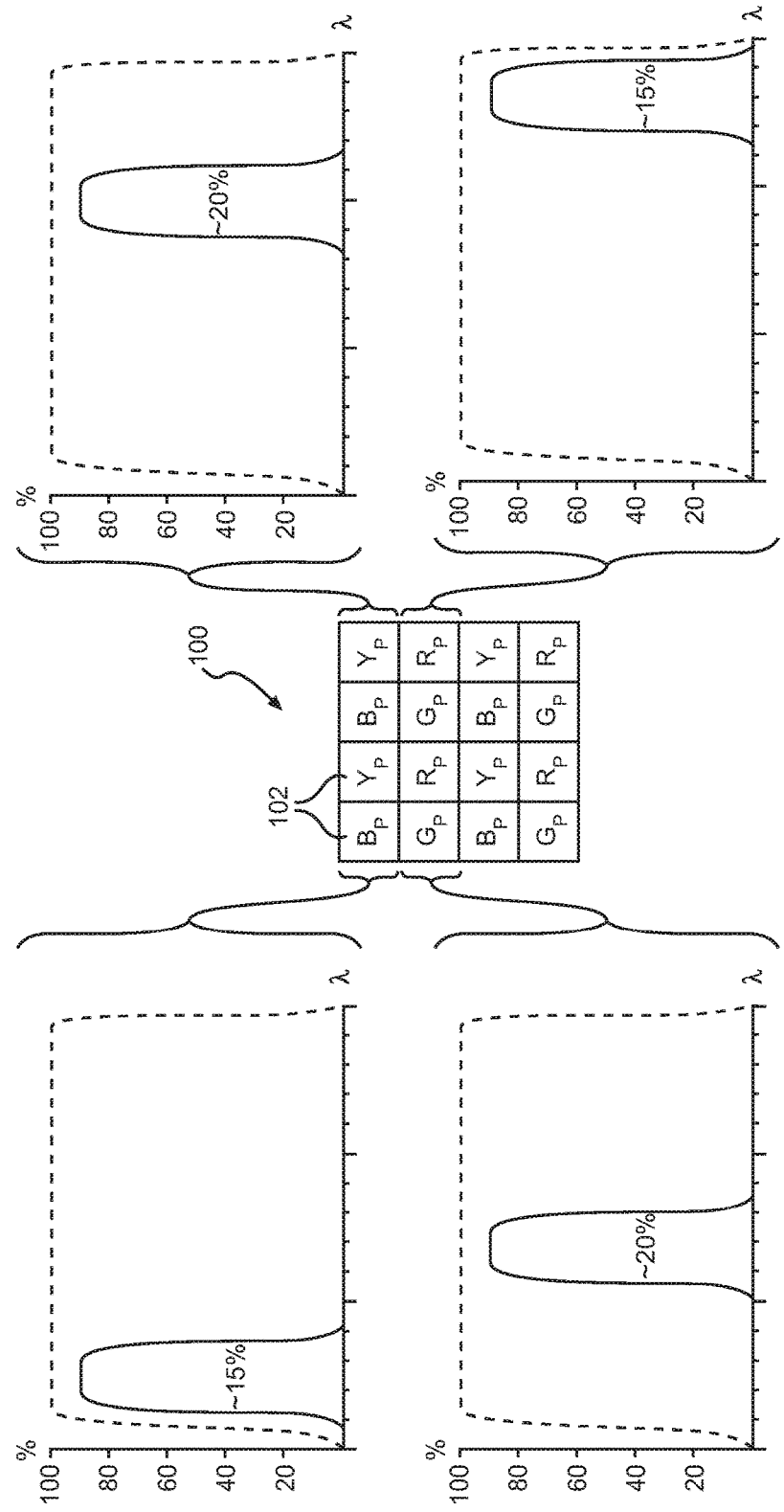
FIG. 1 illustrates a conventional bandpass filter array for an imaging device showing frequency response graphs for the four types of bandpass filters in the array.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first detector value" and "second detector value," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

Embodiments include a filter for imaging with an imaging device, and, in particular, an imaging device having a notch filter array for hyperspectral notch filter imaging. In one embodiment, an imaging device includes a detector array and an aperture disposed along an optical path, with an array of filter elements disposed in the optical path therebetween. The detector array has a plurality of detector elements that are sensitive to a wavelength spectrum of interest, such as, for example, the visible spectrum and/or the infrared (IR) spectrum. Each filter element is configured to filter out energy within the wavelength spectrum of interest that is in a wavelength band of interest to form filtered energy within the wavelength spectrum of interest that is outside the wavelength band of interest.

The filtered energy is passed by each filter element to at least one corresponding detector element, which generates one or more detector values based on the received energy. The detector values may be processed to determine an intensity value for the wavelength band of interest associated with each particular detector element based on the detector value received from the particular detector element and one or more other detector values received from other detector elements in the detector array.

One advantage of this arrangement is that a larger amount of energy is received by each detector element, because the filter elements (e.g., notch filters) only filter out the particular band of interest for each detector element, while passing most of the remaining energy in the wavelength spectrum of interest. This in turn improves signal-to-noise ratio (SNR), thereby reducing the integration time required to achieve the same effective resolution for a particular wavelength band of interest. Since different detectors measure the same wavelength spectrum of interest with different wavelength bands removed, detector values for groups of nearby detectors can be processed to determine the amount of energy that was filtered out by each filter element. While this may increase complexity of the spectral-image reconstruction, the overall SNR is improved.

Another advantage of this arrangement is that a much larger number of wavelength bands of interest may be measured using a notch filter array or similar array with a particular detector array than can be accurately measured using a conventional bandpass filter array with the same detector array, allowing for improvements in resolution and performance in hyperspectral imaging applications. This is because a particular notch filter element that filters out a particular wavelength band of interest may have a large amount of spectral overlap with adjacent notch filter elements that each filters out a different wavelength band of interest. As a result, it is possible to derive much more information about other wavelength bands within the wavelength spectrum of interest as well as the particular wavelength band of interest being filtered out for a particular detector element.

To better illustrate the differences between conventional bandpass filter arrangements and the notch filter arrangements of the disclosed embodiments, FIG. 1 illustrates a conventional bandpass filter array 100 having four types of bandpass filter elements 102 according to the prior art. Each bandpass filter element 102 is configured to pass energy of a particular wavelength band and block all other energy within a wavelength spectrum of interest. For ease of explanation, the wavelength spectrum of interest in this example is the visible light spectrum, and the four types of bandpass filter elements 102 each pass a different wavelength band corresponding to a visible color, e.g., blue ($B_P$), green ($G_P$), yellow ($Y_P$), and red ($R_P$). These color bands are selected because they span the entire visible spectrum with low overlap and relatively small gaps between the different wavelength bands.

However, this type of bandpass filter array 100 has several drawbacks. First, each bandpass filter element 102 in the bandpass filter array 100 blocks the majority of energy within the entire wavelength spectrum of interest, and passes only the energy (e.g., photons) within the wavelength band of interest to a detector array (not shown). For example, as shown by FIG. 1, a typical blue bandpass filter element 102 passes only the energy that is in the blue ($B_P$) wavelength band, which is about 15% of the total energy in the visible spectrum. Likewise, other types of bandpass filter elements configured to pass green ($G_P$), yellow ($Y_P$), or red ($R_P$) wavelengths may also pass 20% or less of the total energy in the visible spectrum. Because so little energy is passed to the detector array (not shown), the detector array requires larger integration times to obtain a high signal-to-noise ratio (SNR) and thus a usable image.

Another drawback of the bandpass filter array 100 of FIG. 1 is that measuring a larger number of wavelength bands of interest causes image accuracy to drop substantially. For example, to accurately measure four different wavelength bands across an image, the different types of bandpass filter elements 102 must each be distributed evenly across the bandpass filter array 100. However, using green ($G_P$) as an example, each green ($G_P$) bandpass filter element 102 is separated from every other green ($G_P$) bandpass filter element 102 by at least one other bandpass filter element 102, either blue ($B_P$), yellow ($Y_P$), or red ($R_P$) in this example. However, there is no way to obtain useful information about the energy in the green ($G_P$) band for any of these other types of bandpass filter elements 102, because substantially all energy in the green ($G_P$) band is blocked by these other types of bandpass filter elements 102. Thus, information about the green ($G_P$) wavelength band in the entire image can only be obtained from 25% of the total area of the bandpass filter array 100. With only four colors, one must optically blur the same point on the object being imaged across all colors, which reduces spatial resolution. However, it is possible to accurately interpolate the green content of the area of each bandpass filter element 102 repeated across the bandpass filter array 100 using de-blurring or other types of algorithms, as is known in the art. As the number of wavelength bands of interest increases, however, the usable area and/or transmitted energy for each wavelength band is reduced further, and distances on the bandpass filter array 100 between bandpass filter elements 102 of a particular wavelength band increase to the point that resolution becomes unacceptably poor. This is because, in order to property sample all wavelengths in all the bandpasses, a single resolved point in a scene would need to be resolved across a larger group of filter elements 102 that includes all the bandpasses. Thus, there is a need in the art for a filter array for an imaging device that allows more information and more signal per number of detector elements to be obtained about a greater number of wavelength bands of interest.

Figure 2:
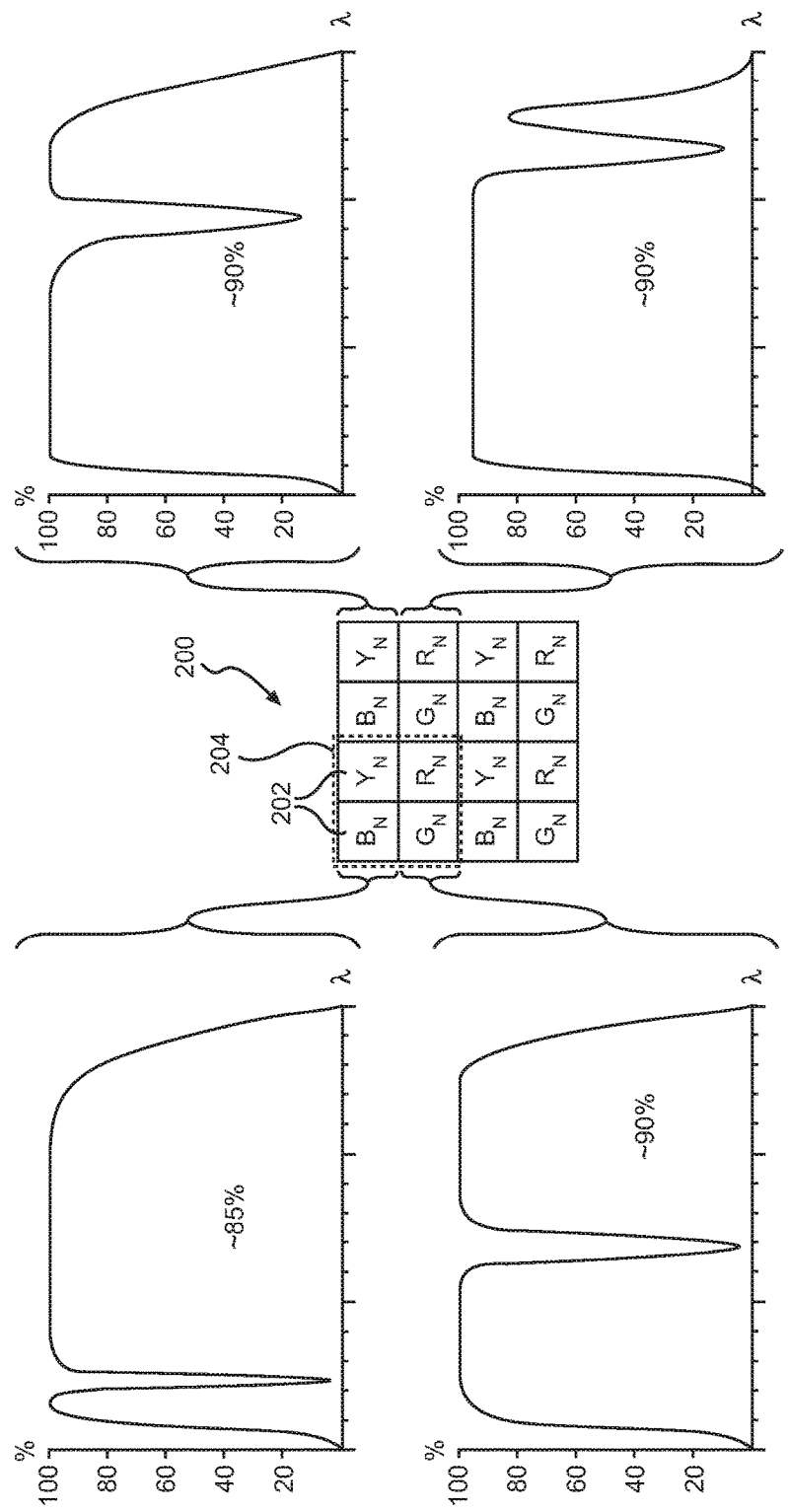
FIG. 2 illustrates a notch filter array for an imaging device according to an embodiment showing frequency response graphs for the four types of notch filters in the array.

In this regard, FIG. 2 illustrates a notch filter array 200 having four types of notch filter elements 202 arranged in a pattern similar to the bandpass filter array 100 of FIG. 1. In the notch filter array 200 of FIG. 2, each notch filter element 202 is configured to block only energy within a particular wavelength band of interest while passing all other energy within a wavelength spectrum of interest. For example, each blue ($B_N$) notch filter element 202 is configured to pass all of the energy in the visible spectrum except for a narrow wavelength band corresponding to the color blue, which is about 85% of the energy in the visible spectrum in this example. Likewise, other types of notch filter elements 202 configured to block green ($G_N$), yellow ($Y_N$), or red ($R_N$) wavelengths are also configured to pass about 85-90% of the energy in the visible spectrum.

This arrangement has two advantages over the bandpass filter array 100 of FIG. 1. First, the amount of energy that passes through the notch filter array 200 to reach the detector array (not shown) is increased four-fold or more over the bandpass filter array 100 of FIG. 1, which in turn substantially increases "temporal agility" and SNR, and reduces integration time required for the detector array to receive sufficient energy to operate effectively. Second, by removing only the energy in the wavelength band of interest for each notch filter element 202 and passing all other energy in the wavelength spectrum of interest, spatial resolution, spectral resolution, signal sensitivity, and other parameters can be retained and additional information regarding the energy in the wavelength band of interest can be derived for the portion of the detector array associated with the notch filter element 202, and also about the energy in the same wavelength band of interest for a surrounding portion of the detector array as well.

As will be described in detail below, a processor device (shown in FIG. 11) or other computing device can determine the energy in the wavelength band of interest associated with a particular notch filter element 202 by determining an energy value corresponding to the energy that is passed by the particular notch filter element 202, and by determining, i.e., sampling, energy values for each of one or more surrounding notch filter elements 202. By inputting the sampled energy values into a spectral function adapted to the specific spatial layout of the notch filter elements 202 in the notch filter array 200, the processing device can derive an energy value associated with the energy in the wavelength band of interest for the particular notch filter element 202 and/or the one or more surrounding notch filter elements 202 with a high degree of accuracy. Each wavelength band of interest in the wavelength spectrum of interest is sampled, because each adjacent notch filter element 202 has about 75-80% bandpass overlap with every other notch filter element 202 in the notch filter array 200.

In a simplified example, notch filter elements 202 of the notch filter array 200 can be grouped together by the spectral function into four image points 204, each having a notch filter element 202 of each type, i.e., blue ($B_N$), green ($G_N$), yellow ($Y_N$), or red ($R_N$). The spectral function may assume that the energy received by all of the notch filter elements 202 in a particular image point 204 has the same spectral profile.

In some embodiments, a spectral function determines the energy in the wavelength bands of interest of different notch filter elements 202 by solving the detected radiance as spectral information. In general, the more orthogonal the sampling of the signal, the more soluble the spectral image. For a conventional bandpass filter array where each bandpass is independent from the others, the resulting system of equations (described below) are "full rank" with inherent band separation. This holds as long as each object point is imaged through each bandpass filter and is blurred across a set of pixels containing all bands (i.e., "super pixel"). However, as the number of different wavelength bands of interest increases, resolution decreases, because information about each individual wavelength band of interest is only available from the pixels in the set of pixels that specifically filter for that individual wavelength band of interest.

On the other hand, when using an array of notched filters, such as the notch filter array 200 of FIG. 2, each filter may have significant overlap with others and may not always be independent. With the entire usable spectral range spanned by notches, the solution may not necessarily be full ranked, thereby requiring more computation to extract spectral information.

For any spectral imaging system, the goal is to solve the spectral information in each detector element. The generalized method is to solve the object's radiance integrated with the filter function for that pixel. This general method applies for any of the implementations or concepts described in this application. A simple imaging model of a multi-spectral system is given by the following equations in Equation 1:

$$F_k = \int_{\lambda_a}^{\lambda_b} \Phi_k(\lambda) g_k(\lambda) d\lambda, k = 0, 1, \ldots, n-1 \quad \text{Equation 1}$$

In Equation 1, $\Phi_k$ is the spectral response filter (SRF), $g_k$ is the signal entering the system, $F_k$ is the signal sample recorded, and $[\lambda_a, \lambda_b]$ is the wavelength spectrum. The subscript k indicates the pixel number association. Therefore, each pixel has an associated SRF and signal, and an associated sample.

In the case of a narrow bandpass multispectral system, each SRF can be represented, for example, by a Gaussian function:

$$\Phi_k(k) = t_k e^{-\frac{(\lambda-\lambda_k)^2}{\Delta\lambda^2}}. \quad \text{Equation 2}$$

In Equation 2, $t_k$ is the maximum response, $\lambda_k$ is the center of the wavelength band of interest, and $\Delta\lambda$ determines its bandwidth. If the optical blur of the system extends over an N×N number of pixels (e.g., a super pixel), then a multispectral image of the unknown signal having a lower than the focal plane array (FPA) spatial resolution is easily reconstructed. Every set of N×N adjacent samples of the signal form a multispectral point of the image. The intensity of the wavelength band of interest, e.g., $g_k^l$ (l-th wavelength band, k-th pixel), is simply the scaled by $t_l$ (the maximum transmission for the l-th wavelength band) sampled signal at the k-th pixel, i.e.

$$g_k^l = F_k/t_l = \int_{\lambda_a}^{\lambda_b} e^{-\frac{(\lambda-\lambda_l)^2}{\Delta\lambda^2}} g_k(\lambda) d\lambda.$$

In a case in which each SRF is a notch filter, the multispectral imaging method discussed above does not yield a multispectral image directly. However, by representing the SRF with multiple spectral response functions one can setup a system of equations which can potentially be solved. Each SRF may be represented (or approximated) by a linear combination of functions from a set of basis functions, e.g. $\{(\varphi^0(\lambda), \varphi^1(\lambda), \ldots, \varphi^{m-1}(\lambda)\}$, where each basis function's shape is similar to a box function, a Gaussian, or other. The SRF can be expressed as the following Equation 3:

$$\Phi_k(\lambda) \approx \sum_{l=0}^{m-1} t_k^l \varphi^l(\lambda), k = 0, 1, \ldots, n-1 \quad \text{Equation 3}$$

In Equation 3, for each k the function on the right hand side is a fit of the function $\Phi_k$ and all $t_k^l$ are real values. By substituting the right hand side of Equation 3 into Equation 1 we get the n×m linear system of equations in Equation 4:

$$F_k = \sum_{l=0}^{m-1} t_k^l g_k^l, k = 0, 1, \ldots, n-1 \quad \text{Equation 4}$$

where, again, $g_k^l$ are the wavelength intensities of interest and are defined as $$g_k^l = \int_{\lambda_a}^{\lambda_b} \varphi^l(\lambda) g_k(\lambda) d\lambda,$$

for l=0, 1, . . . , m−1, k=0, 1, . . . , n−1.

When each image point is not uniquely sampled for all spectral responses, the linear system is generally considered underdetermined. In this case, Equation 4 is solved using a regularized inversion algorithm constrained by image priors (e.g. spatial-spectral correlation, sparsity, etc.). In this manner, multispectral image reconstruction can be achieved with increased spatial resolution and having comparable stability to a fully sampled and fully ranked super pixel and with more stable multispectral image reconstruction.

Figure 3:
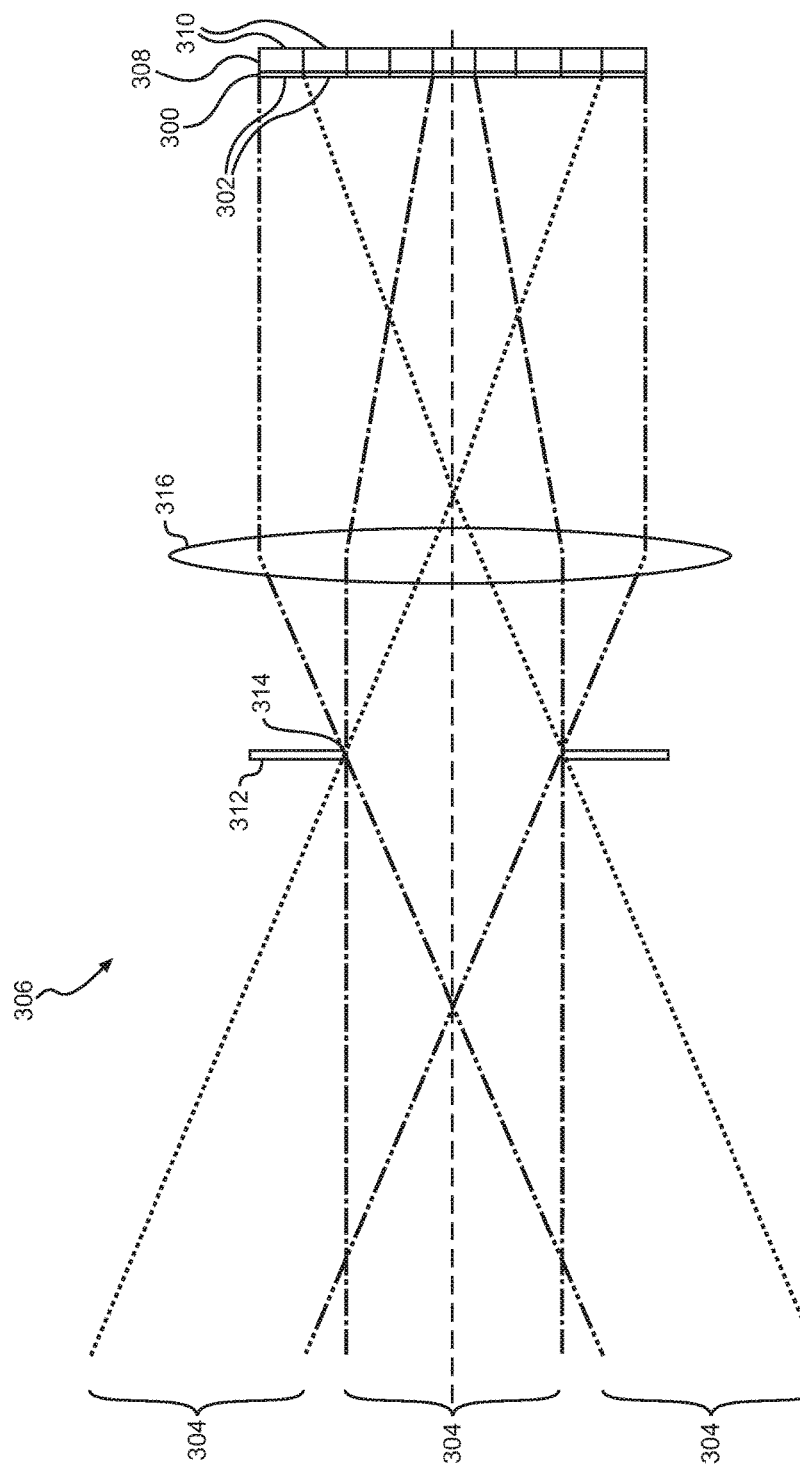
FIG. 3 is a diagram of an imaging device using a notch filter array according to an embodiment.

Referring now to FIG. 3, an imaging device 306 employing a notch filter array 300 similar to the notch filter array 200 of FIG. 2 is illustrated. The imaging device 306 of FIG. 3 includes a detector array 308 having a plurality of detector elements 310 disposed in an optical path. The detector elements 310 of the detector array 308 in this example are all sensitive to a common wavelength spectrum of interest, such as, for example, the visible light spectrum and/or the infrared spectrum. It should be understood that the wavelength spectrum of interest may include any number of wavelengths and/or wavelength bands, and that such wavelengths and/or wavelength bands may be contiguous or non-contiguous.

The imaging device 306 further comprises a diaphragm 312 forming an aperture 314, which forms or defines the optical system. The aperture 314 is configured to pass energy within the wavelength spectrum of interest to the plurality of detector elements 310 of the detector array 308 along the optical path. In this embodiment, an objective lens group 316 is disposed in the optical path between the aperture 314 and the detector array 308. The objective lens group 316 may be a single lens or a group of lenses, and is configured to direct energy received from the aperture 314 to the plurality of detector elements 310, as is known in the art. In this example, energy received from a plurality of image points 304 passes through the aperture 302 at different angles, with energy from each image point 304 being directed to a particular detector element 310 of the detector array 308 through a particular notch filter of the notch filter array 302. Again, for simplicity, energy paths for only three image points 304 are illustrated, but it should be understood that energy paths for additional image points 304 that reach the aperture 314 at different angles of approach will be directed to different detector elements 310 in the detector array 308, thereby mapping the image points 304 of a scene to the detector elements 310 of the detector array 308, as is known in the art.

In this example, each notch filter element 302 of the notch filter array 300 is associated with a single detector element 310 of the detector array 308, but it should be understood that individual notch filter elements 302 may be associated with more than one detector element 310. It should be understood that individual detector elements may be associated with only a single detector element 310, as desired. Each notch filter element 302 filters out energy within a particular wavelength band of interest associated with the notch filter element 302 and passes the remaining energy within the wavelength spectrum of interest outside the wavelength band of interest to the corresponding detector element 310.

Based on the arrangement of the notch filter elements 302 and/or the detector elements 310, a spectral function can be customized to determine spectral information regarding the corresponding wavelength band of interest for each detector element 310 of the detector array 308, as well as additional spectral information regarding other wavelength bands of interest within the wavelength spectrum of interest and/or surrounding detector elements 310. Each detector element 310 is configured to receive the energy (e.g., photons) within the wavelength spectrum of interest that is passed by the corresponding notch filter element 302 and generate a detector value based on the received energy within the wavelength spectrum of interest. The processor device (not shown), in communication with the detector array 308, is configured to then receive a detector value from each detector element 310, and determine an intensity value for the wavelength band of interest associated with each detector element 310 based on the detector value and another detector value associated with another detector element 310 (e.g., an adjacent, contiguous, or proximate detector element 310).

Figure 4:
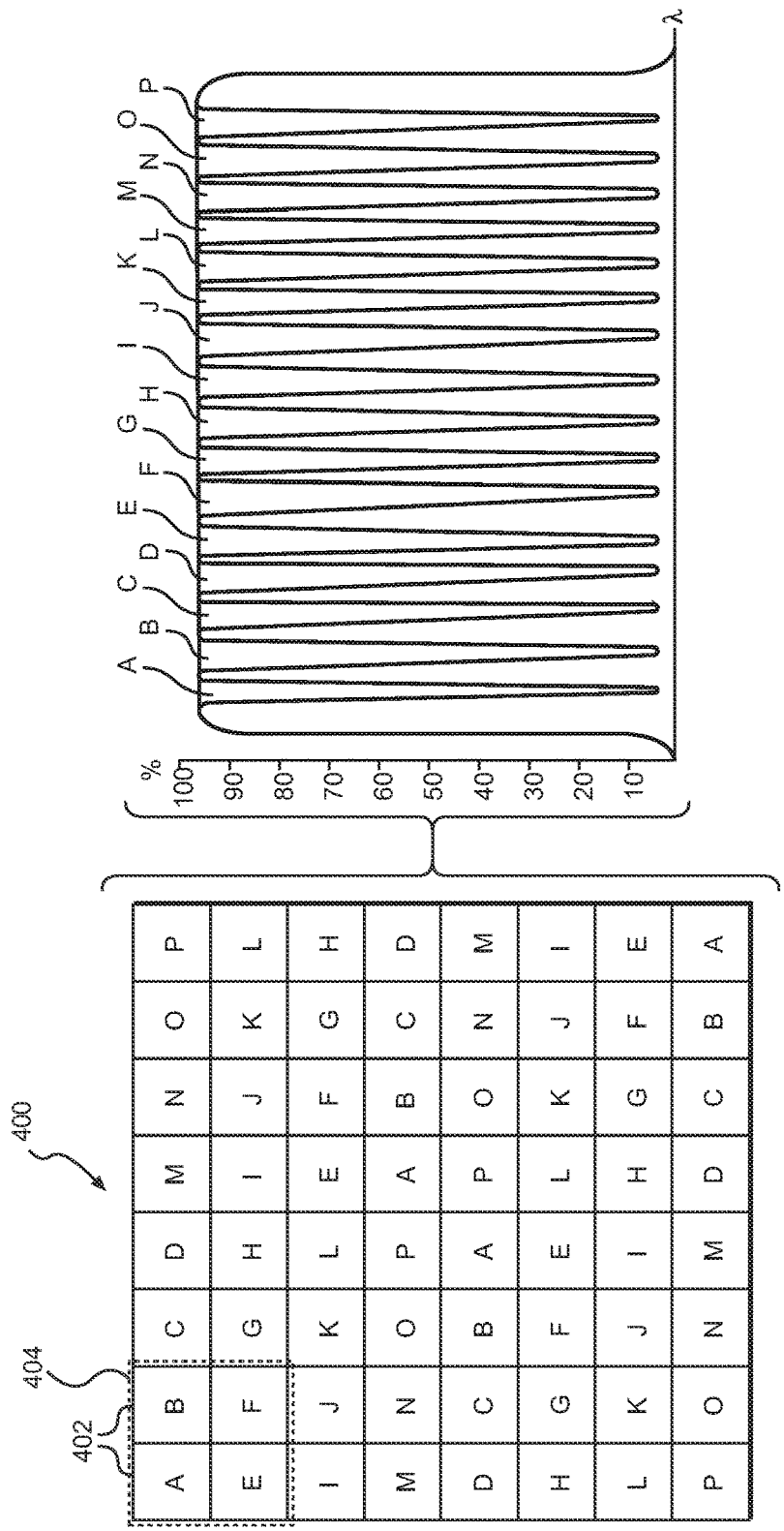
FIG. 4 illustrates a frequency response graph for a notch filter array for an imaging device having sixteen types of notch filters according to another embodiment.

Referring now to FIG. 4, a more complex filter array 400 is illustrated having an 8×8 array of notch filter elements 402 configured to filter out one of sixteen different wavelength bands of interest (labeled A through P). It should be understood, however, that any number or arrangements of notch filter elements may be used in this or other embodiments. For example, a filter array may be an N×N array (e.g., a 2×2 array of 4 elements, up to a 16×16 array of 256 elements, or more), an N×M array (e.g., a 2×3 array), or another arrangement. In this embodiment, the different notch filter elements 402(A)-402(P) are arranged in 4×4 patterns, but it should be understood that other types of patterns, semi-random, or random arrangements may be used. Unlike the conventional bandpass filter array 100 of FIG. 1, here it is advantageous to use a larger number of types of notch filter elements 402, because each notch filter element 402 provides additional information about the energy being filtered by every adjacent notch filter element 402, and vice versa. For example, in this example, each image point 404 corresponds to a 2×2 sub-array of filter elements 402. Referring to the image point 404 corresponding to the upper right portion of the filter array 400, this particular image point 404 includes four notch filter elements 402 that filter out wavelength frequency bands A, B, E, and F, respectively.

As noted above with respect to FIG. 2, a spectral function may be used by a processing device (not shown) to derive an energy value associated with the energy in the wavelength band of interest for the particular notch filter element 402 and/or the one or more surrounding notch filter elements 502 with a high degree of accuracy. As shown by FIG. 4, even when using a large number of notch filter elements 402 that each filter out a different wavelength band of interest, the processor device is still able to derive information regarding the wavelength band of interest for the particular filter element 402 because multiple adjacent and nearby filter elements pass energy in the particular wavelength band of interest. Since each notch filter has a high degree of bandpass overlap (over 85% in this embodiment) with every other notch filter element 402 in the notch filter array 400, it becomes possible to derive a large amount of information about the energy being received by each filter element 402 of the filter array 400.

Figure 5:
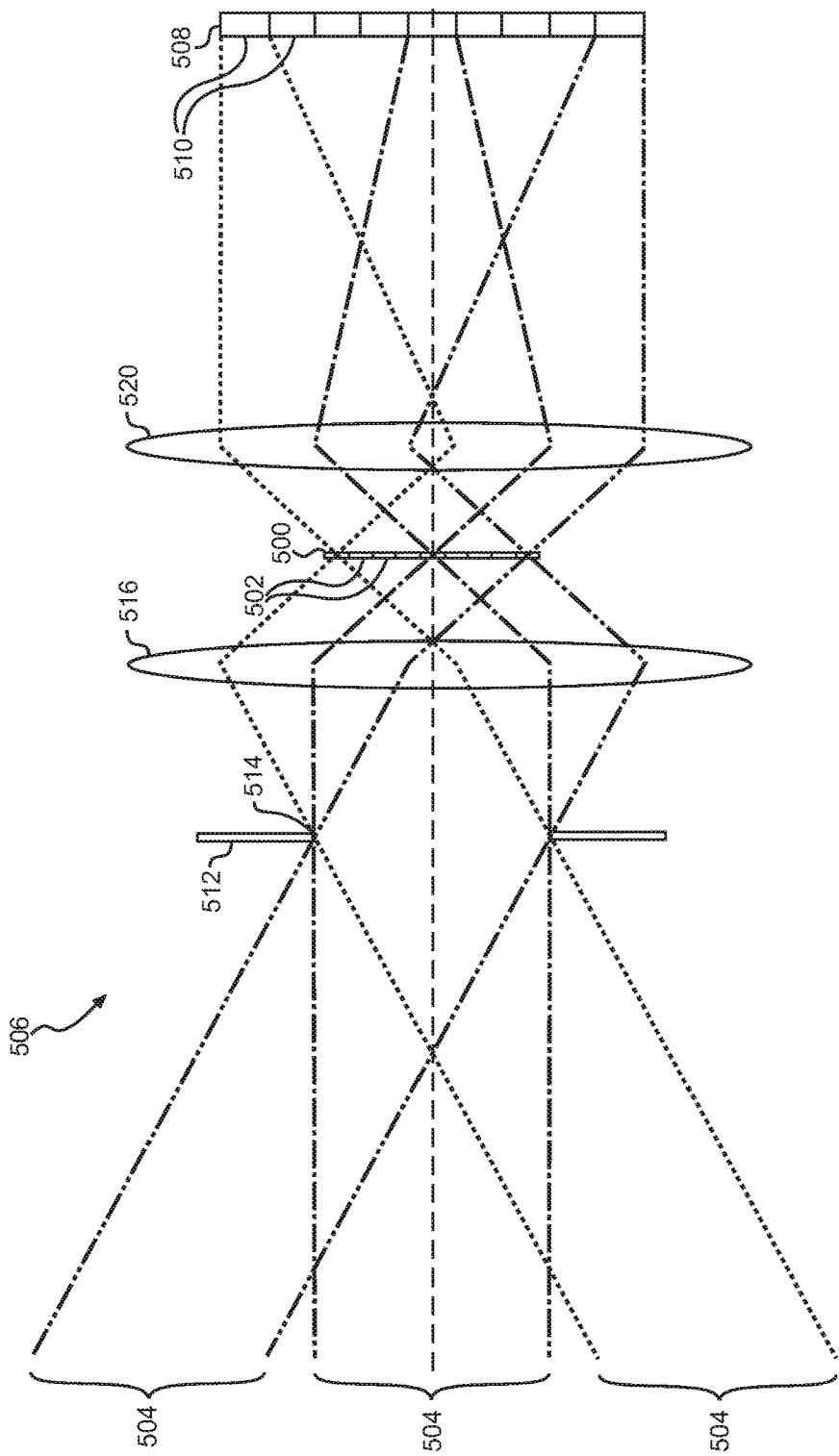
FIG. 5 is a diagram of an imaging device using a notch filter array disposed between an aperture and a relay lens group, according to an embodiment.

In the embodiment of FIG. 3 above, the filter array 300 is disposed adjacent to the detector array 308 in the image plane of the optical path, but it should be understood that a filter array can be disposed at other positions along the optical path as well. In this regard, FIG. 5 illustrates an imaging device 506 similar to the imaging device 306 of FIG. 3. In the embodiment of FIG. 5, a filter array 500 having a plurality of notch filter elements 502 is disposed in an intermediate image plane along the optical path, between an objective lens group 516 and a relay lens group 518. The energy from a plurality of image points 504 is received through an aperture 514 formed in a diaphragm 512 and passed to the objective lens group 516, which focuses the energy of each image point 504 toward one or more of the notch filter elements 502 of the filter array 500 in the intermediate image plane. The energy is passed to the relay lens group 518, which refocuses the energy of each image point 504 toward corresponding detector elements 510 in the detector array 508.

This arrangement has the advantage of separating the filter array 500 from the detector array 508, which allows the filter array 500 to be formed as part of a removable component. This allows different filter arrays 500 to be used for different applications in the same imaging device 506. For example, an imaging device could use a notch filter array 500 configured to pass energy in the visible spectrum for some applications, and another interchangeable notch filter array 500 configured to pass energy in the short-wave infrared (SWIR) spectrum for other applications. In this example, the detector array 508 would be sensitive to both the visible spectrum and SWIR spectrum, but the detector array 508 would only receive energy in the visible spectrum or in the SWIR spectrum depending on the type of interchangeable notch filter array 500 being used. In this embodiment, the notch filter array 500 may be manually removable and installable by a user. In another embodiment, the imaging device 506 may include a plurality of notch filter arrays 500 and be configured to move any number of the plurality of notch filter arrays 500 into or out of the optical path as desired. As will be discussed in greater detail with respect to FIG. 8, it may be desirable to "stack" multiple notch filter arrays 500 in the optical path, in order to filter multiple wavelength bands of interest from each image point 504, to increase resolution and performance.

In another embodiment, the filter array may be transversely movable with respect to the optical path among a plurality of filter array positions. In this example, each detector element may be configured to receive the filtered energy from a first filter element when the filter array is in a first filter array position, and receive the filtered energy from a second filter element when the filter array is in a second filter array position. For example, an oversized (with respect to the image size) scattered notch filter array may be placed on a piezo scanner and moved transversely so that multiple spectral samples of the image are recorded and used for spectral image reconstruction. This embodiment may be particularly suitable to a case where the system to solve is underdetermined.

In the embodiments of FIGS. 3 and 5, the filter arrays 300, 500 are each disposed in an image plane along the optical path, with each image point 304, 504 passing through a unique subset of notch filter elements 302, 502. As the number of wavelength bands of interest increases, however, the expense and complexity of the filter arrays 300, 500 greatly increase as well. Many conventional bandpass filter arrays, such as the bandpass filter array 100 above, use a small number of types of filters (e.g., 3 or 4) in a regular pattern (e.g., Bayer pattern), which reduces cost and complexity. Many of these bandpass filter arrays are also mass produced, which further reduces costs. Notch filter elements, on the other hand, are produced in smaller volume, and the larger number of different types of notch filter elements (e.g., 8, 16, or more) makes notch filter arrays, such as notch filter arrays 300, 500 above) much more expensive and complex to produce. In addition, the notch filters may also be arranged in potentially irregular patterns in the array, further increasing cost and complexity. Thus, there is an additional need to reduce costs and complexity for notch filter arrays for use with imaging devices.

Figure 6:
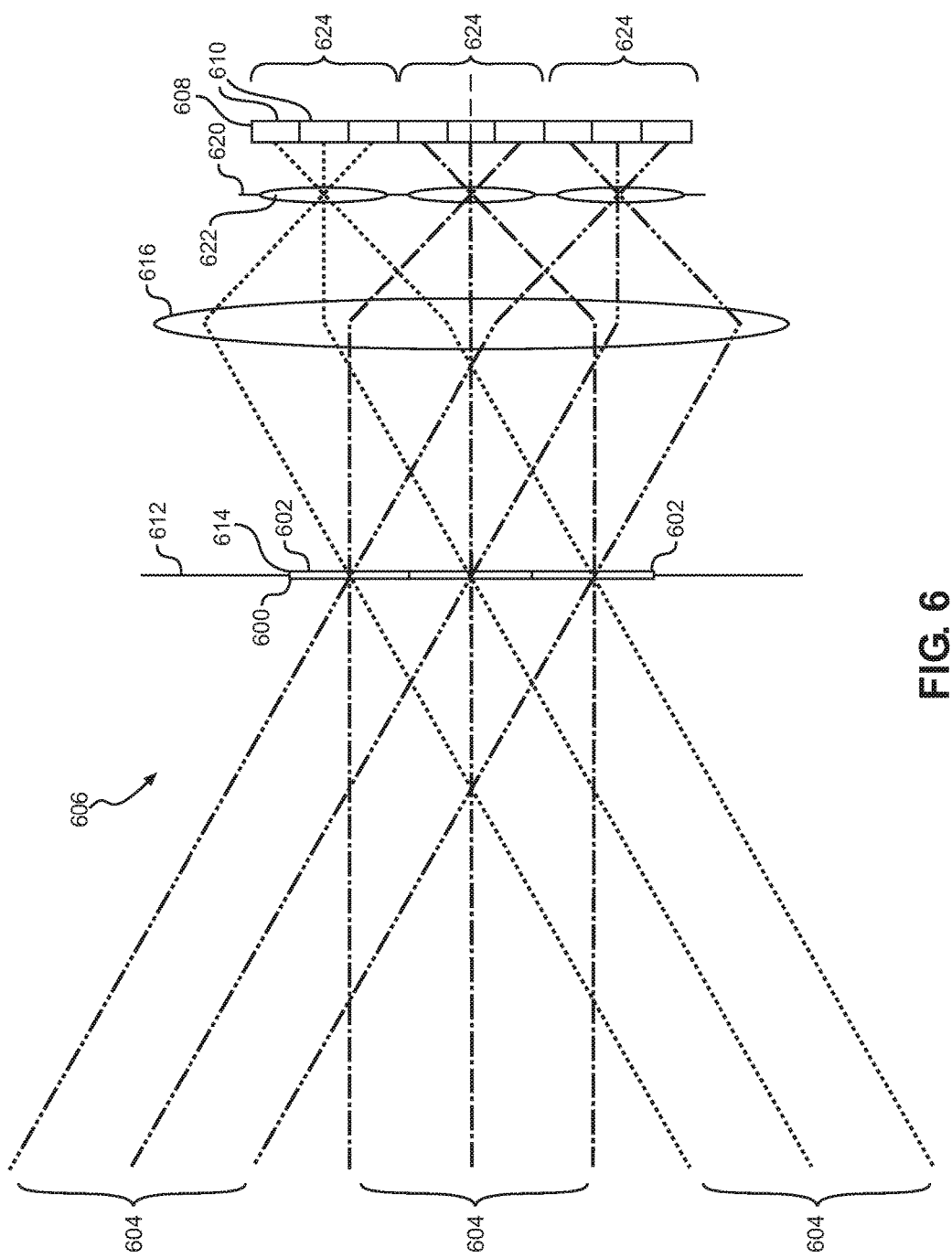
FIG. 6 is a diagram of an imaging device using a notch filter array disposed in an aperture, according to an alternate embodiment.

In this regard, FIG. 6 illustrates an imaging device 606 according to an alternative embodiment, in which a simplified notch filter array 600 is disposed in an aperture 614 of a diaphragm 612 along the optical path. As will be discussed in greater detail with respect to FIGS. 7A-7C, the notch filter array 600 in this embodiment is a single 3×3 array of notch filter elements 602, through which energy from each image point 604 passes simultaneously at different angles of approach. Energy from each image point 604 is directed through an objective lens group 616 to a microlens array 620 comprising a plurality of microlens elements 622. In this embodiment, each microlens element 622 passes the energy from a particular image point 604 to a contiguous subset 624 of detector elements 610 of a detector array 608. This contiguous subset 624 of detector elements 610, which collects energy from a high number of different notch filter elements 602 for a single image point 604, may alternatively be referred to as a "super-pixel" 624. In this example, each notch filter element 602 corresponds to a unique detector element 610 in each super-pixel 624 in a 1:1 relationship, but it should be understood that each notch filter element 602 may alternatively correspond to multiple detector elements 610 in a particular super-pixel 624, or vice versa, as desired.

Figure 7:
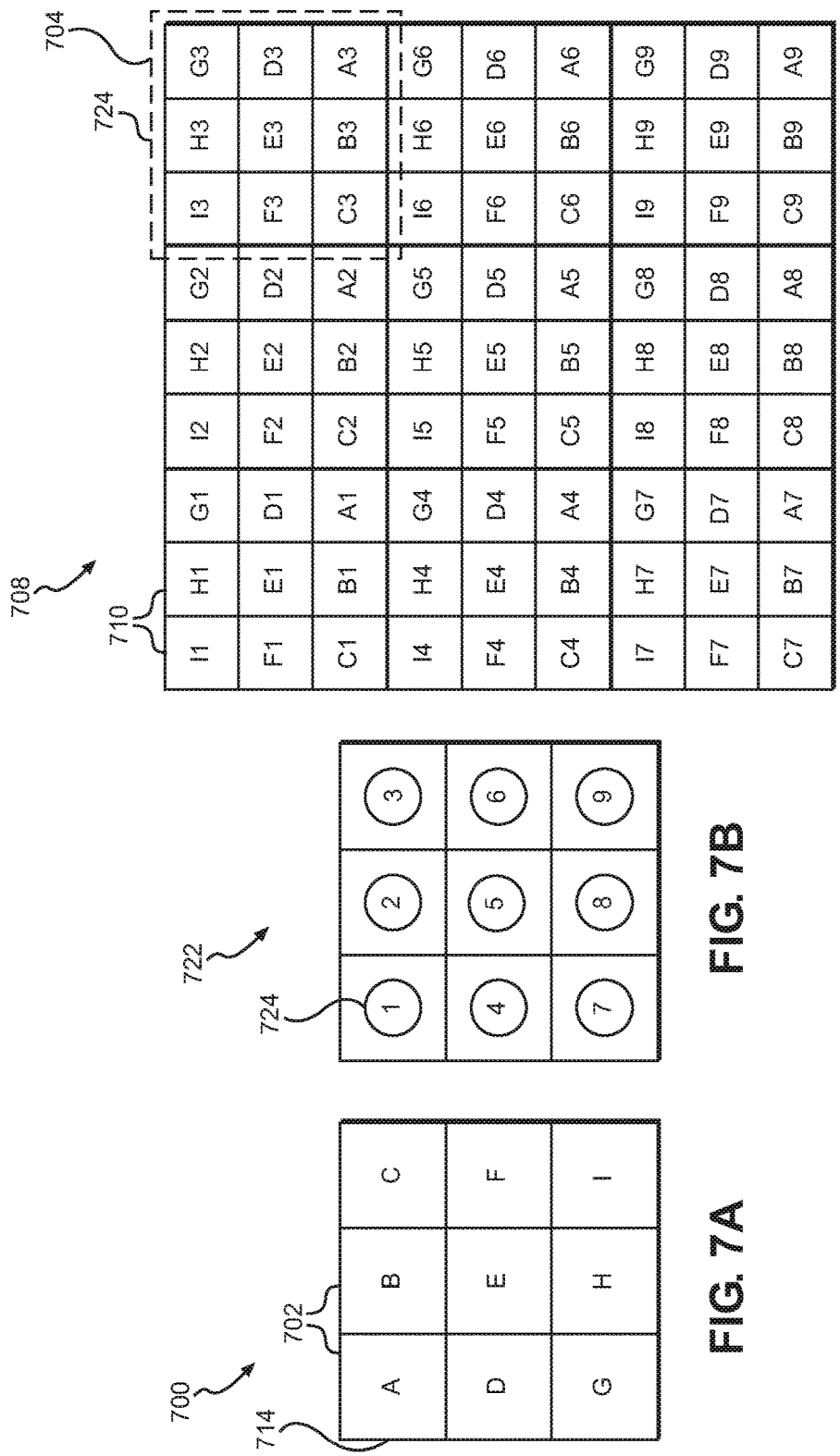
FIGS. 7A-7C illustrate components of an imaging device using a notch filter array, according to an alternate embodiment.

FIGS. 7A-7C illustrate additional views of a notch filter array 700, a microlens array 720, and detector array 708, similar to the notch filter array 600, microlens array 620, and detector array 608 of FIG. 6 above. The notch filter array 700 of FIG. 7A is a 3×3 array of notch filter elements 702, each configured to filter out a different wavelength band of interest (labeled A through I), but it should be understood that a different number or arrangement of notch filter elements 702 could be used. The microlens array 722 of FIG. 7B is a 3×3 array of microlens elements 724 (labeled 1 through 9), but it should also be understood that a different number or arrangement of microlens elements 724 could be used, and that this number and/or arrangement is not dependent on the number and/or arrangement of notch filter elements 702 in the notch filter array 700 of FIG. 7A. In this embodiment, energy from nine image points 704 of a scene converge and pass through the aperture 714 from nine different angles of approach. Thus, each image point 704 also passes through all nine of the notch filter elements 702 of the notch filter array 700 disposed in the aperture 714 at different angles of approach.

The filtered energy for image point 704 is passed to a corresponding microlens element 722 of the microlens array 720 (e.g., through an objective lens group similar to the objective lens group 616 of FIG. 6). Each microlens element 722 directs a portion of the filtered energy of the respective image point 704 to a unique subset of detector elements 710 of the detector array 708. In this embodiment, for simplicity, each portion of the filtered energy for a particular image point 704 corresponding to a particular notch filter element is directed to a unique detector element 710 in a 1:1 relationship, but it should be understood that other arrangements are possible, as discussed above.

Each 3×3 group of detector elements 710 forms a super pixel 724 corresponding to the single image point, thereby providing nine different detector values for the super-pixel, each based on a different (but overlapping) filtered portion of the energy received from the image point. For example, referring to the super-pixel 724 labeled in FIG. 7C, energy from an image point 704 passes through the filter array 700 at a particular angle of approach and is directed toward microlens element 722(3). Microlens element 722(3) inverts and projects the image point 704 onto detector elements 710(A3)-708(I3) to form super-pixel 724. In particular, the portion of the energy of image point 704 that is filtered by notch filter element 702(A) is directed through the microlens element 722(3) toward detector element 710(A3), the portion of the energy of image point 704 that is filtered by notch filter element 702(6) is directed through the microlens element 722(3) toward detector element 710(B3), and so on. In this manner, a notch filter array 700 having a relatively simple array (e.g., 2×2, 3×3, 4×4, etc.) can be produced at relatively low expense for use with the embodiments disclosed herein.

Figure 8:
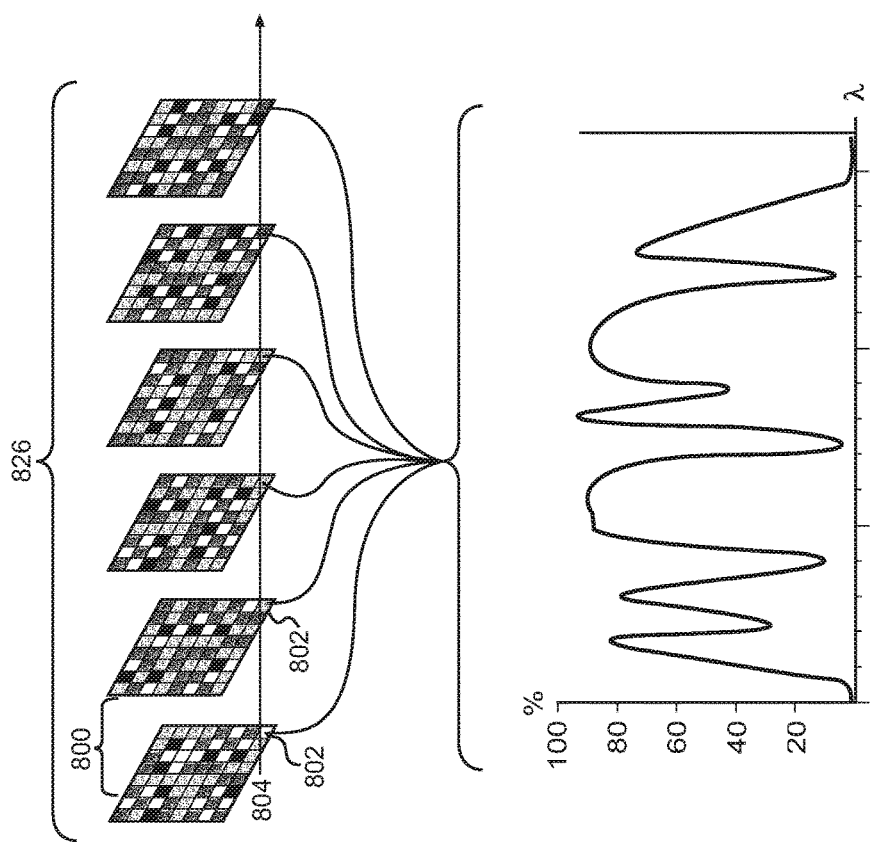
FIG. 8 illustrates a stacked notch filter array configured to filter multiple wavelength bands of interest for each image point, according to an alternate embodiment.

As noted above with respect to FIG. 4, it may be desirable to "stack" multiple notch filter arrays, such as the notch filter arrays 300, 500, 600, in the optical path, in order to filter multiple non-contiguous wavelength bands of interest from each image point, to increase resolution and performance. Referring now to FIG. 8, a simplified view of a plurality of notch filter arrays 800 arranged in a stack 826 is illustrated. In this embodiment, each image point 804 passes through one notch filter element 802 of each notch filter array 800, with each notch filter element 802 configured to filter out a different wavelength band of interest within the wavelength spectrum of interest. For illustration of this concept, FIG. 8 provides an example of a frequency response graph produced for a single image point 804 by stacked notch filter elements 802 in the stack 826.

With the notches stacked, the spectral response function can be tailored to match the object of interest with respect to a background against which the object of interest is likely to be found. For example, a red car could be filtered against a background of autumn leaves, with its corresponding covariance/correlation spectral matrix, by optically producing a spectral response filter that includes a spectral matched filter in the stacked notches. The spectral response filter may be produced to optimize the separation of the wavebands of interest expected to be associated with the object of interest (i.e., the red car paint) from the expected background wavebands (i.e., the autumn leaves), thereby increasing contrast in the resulting image between an object of interest and an expected background. The spectral matched filter function could be optically produced in a stacked notch filter.

In another embodiment, a single array of multivariate notch filters may be used, with each multivariate notch filter configured to filter a wavelength band of interest comprising a plurality of non-contiguous wavelength bands within the wavelength spectrum of interest. Similar to passing energy from adjacent image points onto a single detector element, the detector value produced by a detector element receiving filtered energy from the stack 826 of FIG. 8 (or from a multivariate notch filter element having similar functionality) can processed by a spectral function as described above to derive information about the wavelength band(s) of interest for the image point 804 and for other image points 804. In another embodiment, one or more of the filter arrays 800 may comprise different types of filters, such as, for example, polarization filters configured to pass energy having a particular polarization orientation, and/or phase filters configured to shift the phase of energy transmitted or pass energy having a particular phase. In embodiments for which one or more of the filter arrays 800 and/or the stack 826 is in the aperture plane, the positions of polarization and/or phase filters could be optimized by field angles of the field lenses in the microlens array (such as the microlens array 620, 720 above).

Figure 9:
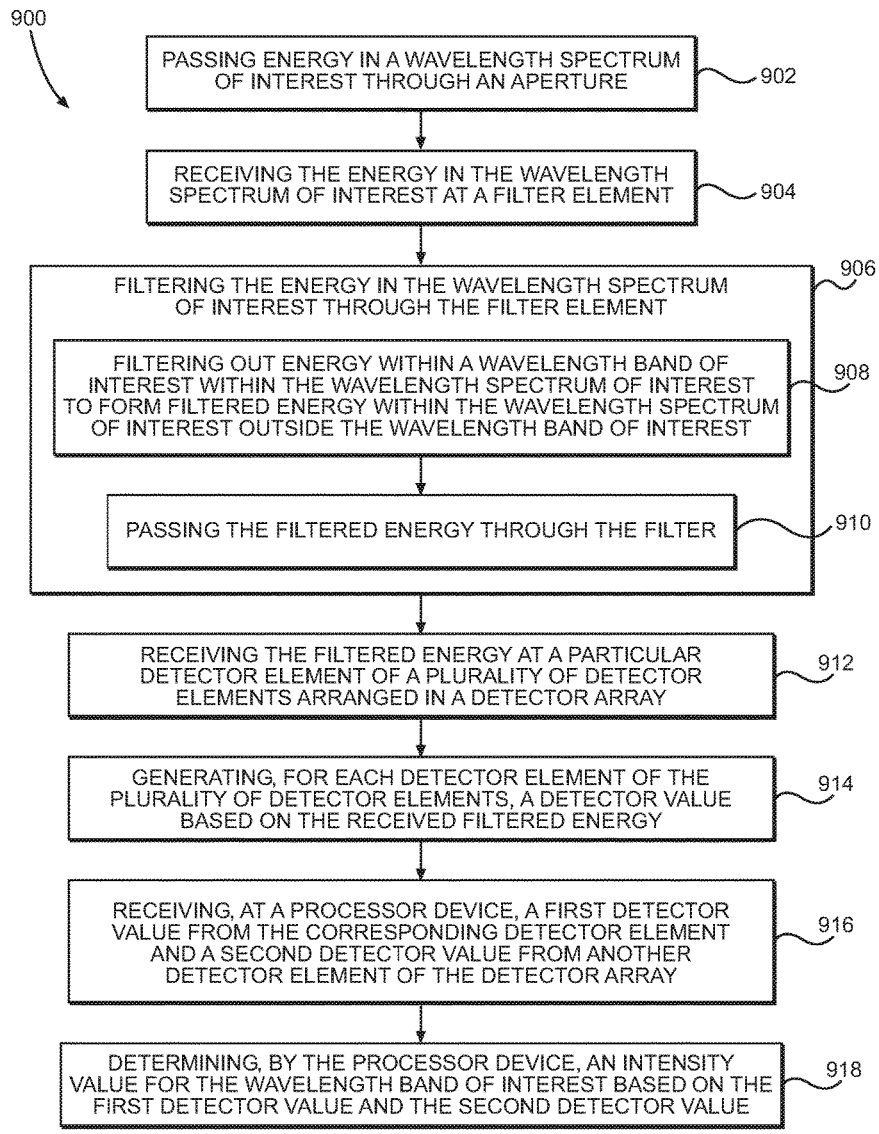
FIG. 9 is a flowchart illustrating an imaging method, according to an embodiment.

Referring now to FIG. 9, a flowchart of an imaging method 900 is illustrated according to an embodiment. The imaging method 900 comprises passing energy in a wavelength spectrum of interest through an aperture (Block 902) and receiving the energy in the wavelength spectrum of interest at a filter element (Block 904). The imaging method 900 further comprises filtering the energy in the wavelength spectrum of interest through the filter element (Block 906), comprising filtering out energy within a wavelength band of interest within the wavelength spectrum of interest to form filtered energy within the wavelength spectrum of interest outside the wavelength band of interest (Block 908) and passing the filtered energy through the filter (Block 910). The imaging method 900 further comprises receiving the filtered energy at a particular detector element of a plurality of detector elements arranged in a detector array (Block 912). The imaging method 900 may also include additional steps, including generating, for each detector element of the plurality of detector elements, a detector value based on the received filtered energy (Block 914), receiving, at a processor device, a first detector value from the corresponding detector element and a second detector value from another detector element of the detector array (Block 916), and determining, by the processor device, an intensity value for the wavelength band of interest based on the first detector value and the second detector value (Block 918).

Figure 10:
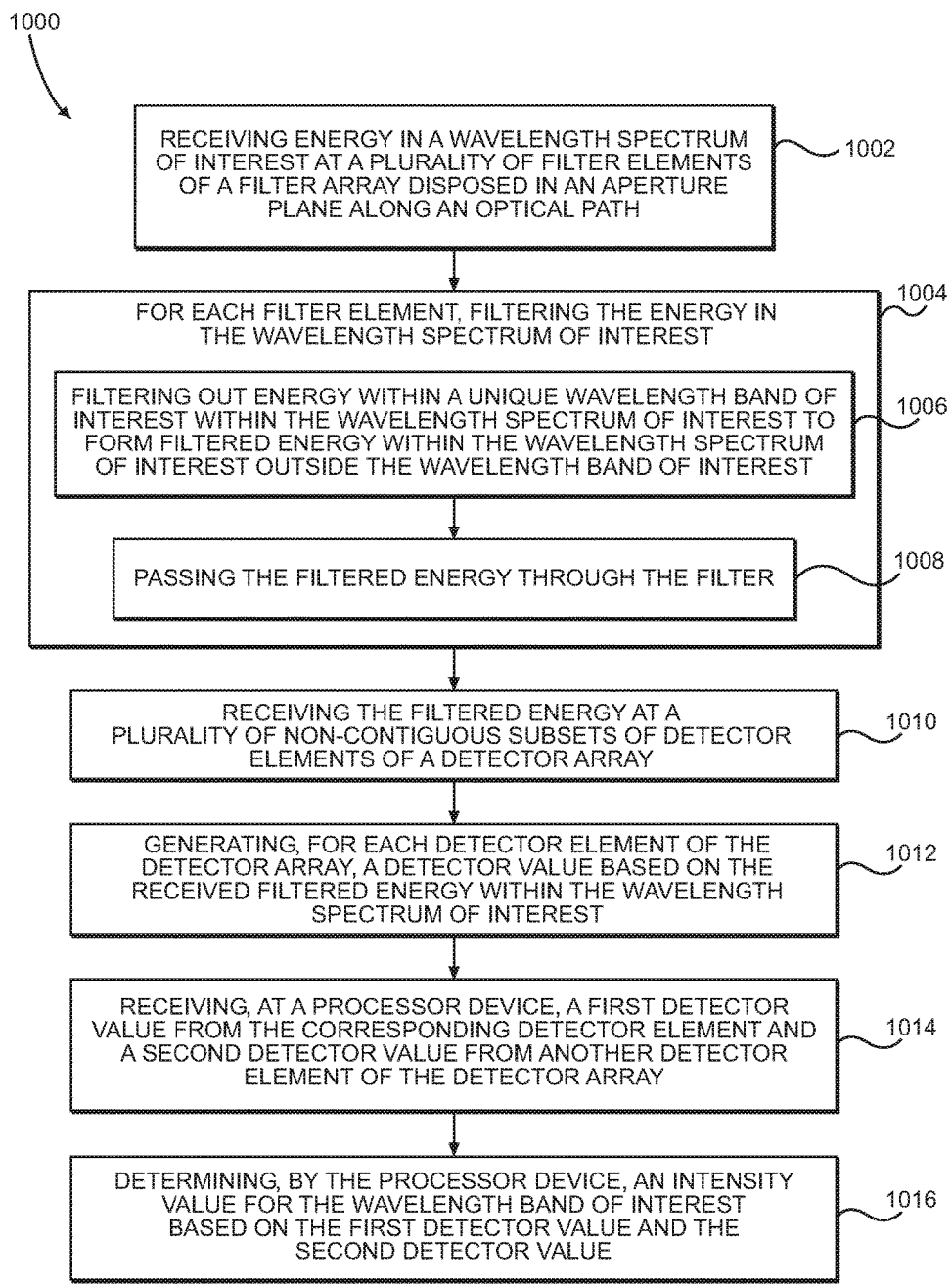
FIG. 10 is a flowchart illustrating an imaging method, according to an alternate embodiment.

Referring now to FIG. 10, a flowchart of an imaging method 1000 is illustrated according to another embodiment. The imaging method 1000 comprises receiving energy in a wavelength spectrum of interest at a plurality of filter elements of a filter array disposed in an aperture plane along an optical path (Block 1002). The imaging method 1000 further comprises, for each filter element, filtering the energy in the wavelength spectrum of interest (Block 1004), including filtering out energy within a unique wavelength band of interest within the wavelength spectrum of interest for form filtered energy within the wavelength spectrum of interest outside the wavelength band of interest (Block 1006) and passing the filtered energy through the filter (Block 1008). The imaging method further comprises receiving the filtered energy at a plurality of non-contiguous subsets of detector elements of a detector array (Block 1010). The imaging method 1000 may also include additional steps, including generating, for each detector element of the detector array, a detector value based on the received energy within the wavelength spectrum of interest (Block 1012), receiving, at a processor device, a first detector value from the corresponding detector element and a second detector value from another detector element of the detector array (Block 1014), and determining, by the processor device, an intensity value for the first wavelength band of interest based on the first detector value and the second detector value (Block 1016).

Figure 11:
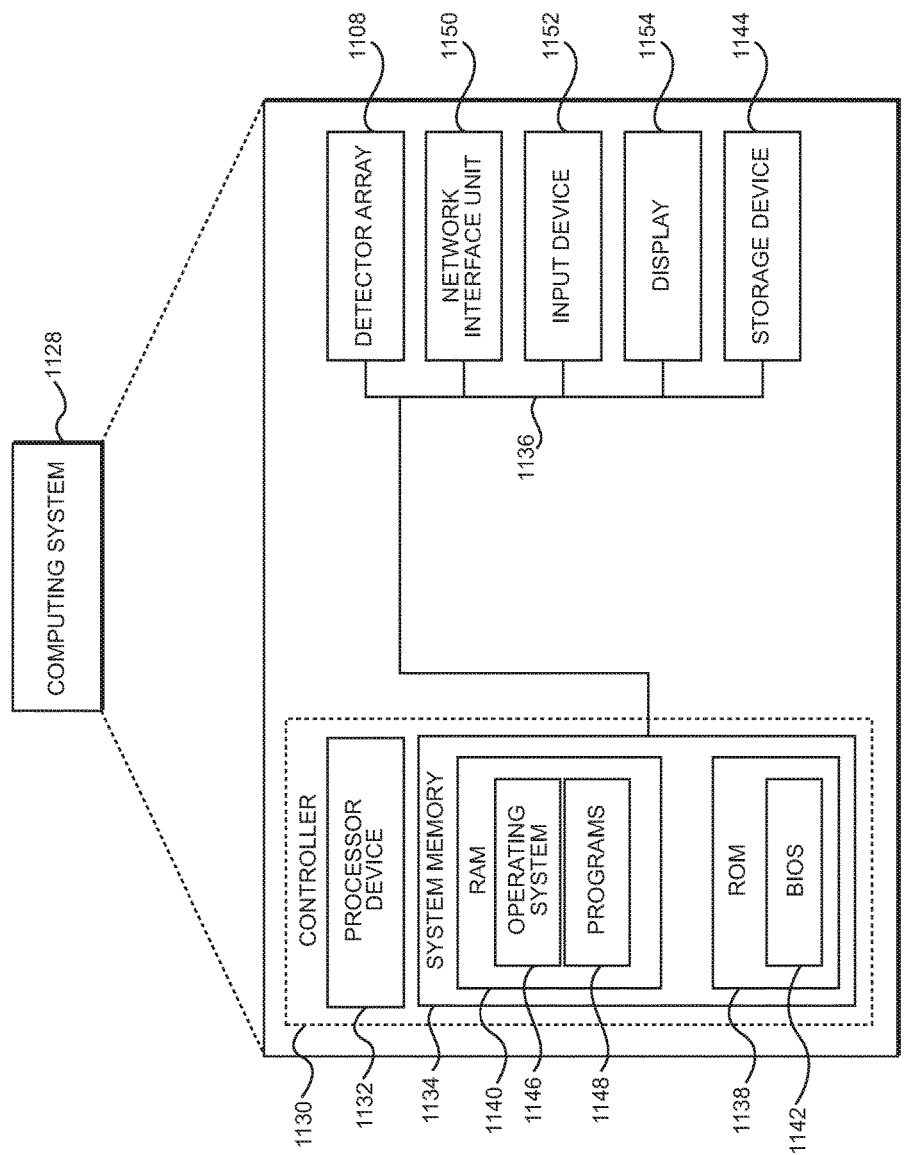
FIG. 11 is a block diagram of a computing device configured to be used in conjunction with embodiments disclosed herein, according to an embodiment.

The components and features herein may be embodied in one or more computing devices, or computer-readable media having computer-readable instructions, operable for performing methods, such as methods 900, 1000 of FIGS. 9 and 10, disclosed herein. In this regard, FIG. 11 illustrates a block diagram for a computing device 1128, according to an embodiment. The computing device 1128 includes a detector array 1108 similar to the detector arrays 308, 508, 608 of FIGS. 3, 5, and 6 in this embodiment, but it should be understood that aspects of the computing device 1128 described herein may be used in connection with other devices or components of disclosed herein.

In this embodiment, the computing device 1128 may comprise any computing or processing device capable of including firmware, hardware, and/or executing software instructions to implement the functionality described herein, and which is capable of being incorporated into components described herein. In this example, the computing device 1128 includes a controller 1130 having a processor device 1132, a system memory 1134, and a system bus 1136. The system bus 1136 provides an interface for system components including, but not limited to, the system memory 1134 and the processor device 1132. The processor device 1132 can be any commercially available or proprietary processor.

The system bus 1136 may be any of several types of bus structures that may further interconnect to a memory bus (with or without a memory controller), a peripheral bus, and/or a local bus using any of a variety of commercially available bus architectures. The system memory 1134 may include non-volatile memory 1138 (e.g., read only memory (ROM), erasable programmable read-only memory (EPROM), electrically erasable programmable read-only memory (EEPROM), etc., and/or volatile memory 1140 (e.g., random-access memory (RAM). A basic input/output system (BIOS) 1142 may be stored in the non-volatile memory 1138 and can include the basic routines that help to transfer the information between the elements within the computing device 1128.

The computing device 1128 may further include a non-transitory computer-readable storage 1134, which may comprise, for example, internal solid state memory, or the like. The computer-readable storage 1144 may provide non-volatile storage of the data, the data structures, the computer-executable instructions, and the like. The data structures can store information relating to, for example, broadcast programs, media, or user information. Computer-executable instructions may include pre-defined data processing instructions, or downloaded instructions for data processing at a specified time or interval, for example.

A number of modules can be stored in the computer-readable storage 1144 and/or in the volatile memory 1140, including an operating system 1146 and one or more programs 1148, which may implement the functionality described herein in whole or in part.

In addition, the computing device 1128 may include additional components, such as a network interface unit 1150 or other communications interface, one or more input devices 1152, and a display 1154 or other visual indicator interface. In some embodiments, the network interface unit 1150, input device 1152, and/or other components of the computing device 1128 may interact with other components outside the computing device 1128, and in some embodiments, the detector array 1108 and/or other imaging components of an imaging device may be disposed outside the computing device 1128 and/or may be in remotely communication with the computing device 1128.

Those skilled in the art will recognize improvements and modifications to the preferred embodiments of the disclosure. All such improvements and modifications are considered within the scope of the concepts disclosed herein and the claims that follow.

What is claimed is:

1. An imaging device comprising:
    a detector array comprising a plurality of detector elements sensitive to a wavelength spectrum of interest;
    a diaphragm forming an aperture, the aperture and the detector array forming an optical path, the aperture configured to pass energy within the wavelength spectrum of interest to the plurality of detector elements of the detector array along the optical path;
    a filter array comprising a plurality of notch filter elements positioned in the optical path between the aperture and the detector array, each notch filter element mapped to one or more particular detector elements, and configured to:
        filter out energy within a wavelength band of interest within the wavelength spectrum of interest to form filtered energy within the wavelength spectrum of interest outside the wavelength band of interest, at least some of the notch filter elements configured to filter out a different wavelength band of interest than others of the notch filter elements; and
        pass the filtered energy to one or more corresponding detector elements of the plurality of detector elements to which the notch filter element is mapped;
    a processor device in communication with the detector array, the processor device configured to:
        receive a detector value from each detector element that quantifies the filtered energy received by the detector element; and
        determine, based on the detector values and the notch filter elements that are mapped to the detector elements that generated the detector values, data that quantifies the energy filtered out by the plurality of notch filter elements.

2. The imaging device of claim 1, the filter array comprising a plurality of subsets of filter elements,
    each subset of filter elements configured to filter out energy within a unique wavelength band of interest within the wavelength band of interest to form filtered energy within the wavelength spectrum of interest outside the unique wavelength band of interest, and
    each subset of filter elements configured to pass the filtered energy to a corresponding subset of detector elements of the plurality of detector elements.

3. The imaging device of claim 2, wherein each detector element of the plurality of detector elements is configured to:
    receive energy within the wavelength spectrum of interest; and
    generate a detector value based on the received filtered energy within the wavelength spectrum of interest, and
    wherein the processor device is further configured to:
        receive a detector value from each of the detector elements of the plurality of detector elements; and
        for each detector element, determine a corresponding intensity value for the wavelength band of interest corresponding to the detector element based on the detector value corresponding to the detector element and another detector value corresponding to another detector element of the plurality of detector elements.

4. The imaging device of claim 2, the plurality of subsets of filter elements comprising at least eight subsets of filter elements.

5. The imaging device of claim 2, the plurality of subsets of filter elements comprising at least sixteen subsets of filter elements.

6. The imaging device of claim 2, each unique wavelength band of interest comprising a plurality of non-contiguous wavelength bands within the wavelength spectrum of interest.

7. The imaging device of claim 2, wherein the filter array is transversely movable with respect to the optical path, and wherein each detector element is configured to:
    receive the filtered energy from a first filter element when the filter array is in a first filter array position; and
    receive the filtered energy from a second filter element when the filter array is in a second filter array position.

8. The imaging device of claim 1, each notch filter element comprising a multivariate notch filter element.

9. The imaging device of claim 1, wherein the filter array is positioned in the optical path adjacent the detector array.

10. The imaging device of claim 1, further comprising a lens positioned in the optical path between the filter array and the detector array.

11. The imaging device of claim 1, wherein each notch filter element is configured to pass the filtered energy to a single corresponding detector element of the plurality of detector elements.

12. The imaging device of claim 1, wherein each notch filter element is configured to pass the filtered energy to a plurality of corresponding detector elements of the plurality of detector elements.

13. The imaging device of claim 1, the wavelength spectrum of interest comprising at least a portion of the visible light spectrum.

14. The imaging device of claim 1, the wavelength spectrum of interest comprising at least a portion of the infrared spectrum.

15. The imaging device of claim 1 wherein each notch filter element filters out the energy within the wavelength band of interest that is less than about 15% of a total amount of energy within the wavelength spectrum of interest.

16. The imaging device of claim 1 wherein to determine the data that quantifies the energy filtered out by the plurality of notch filter elements, the processor device is further configured to use an inversion algorithm to reconstruct the energy filtered out by the plurality of notch filter elements.

17. An imaging method comprising:
  passing energy in a wavelength spectrum of interest through an aperture;
  receiving the energy in the wavelength spectrum of interest at a filter array comprising a plurality of notch filter elements positioned in an optical path between the aperture and a detector array comprising a plurality of detector elements, each notch filter element mapped to one or more particular detector elements;
  filtering the energy in the wavelength spectrum of interest through the filter array, comprising:
    filtering out energy within a wavelength band of interest within the wavelength spectrum of interest, by each notch filter element, to form filtered energy within the wavelength spectrum of interest outside the wavelength band of interest, at least some of the notch filter elements configured to filter out a different wavelength band of interest than others of the notch filter elements; and
    passing the filtered energy to one or more corresponding detector elements of the plurality of detector elements to which the notch filter element is mapped;
  receiving, by a processor device in communication with the detector array, a detector value from each detector element that quantifies filtered energy received by the detector element; and
  determining, based on the detector values and the notch filter elements that are mapped to the detector elements that generated the detector values, data that quantifies the energy filtered out by the plurality of notch filter elements.

18. An imaging device comprising:
  a detector array comprising a plurality of detector elements sensitive to a wavelength spectrum of interest;
  a diaphragm forming an aperture, the aperture and the detector array forming an optical path, the aperture configured to pass energy within the wavelength spectrum of interest to the plurality of detector elements of the detector array along the optical path; and
  a filter element positioned in the optical path between the aperture and the detector array, the filter element comprising a plurality of multivariate notch filter elements arranged in a filter array,
  each multivariate notch filter element configured to filter out energy within a plurality of unique wavelength bands of interest within the wavelength band of interest to form filtered energy within the wavelength spectrum of interest outside the unique wavelength bands of interest, and
  each multivariate notch filter element configured to pass the filtered energy to at least one corresponding detector element of the plurality of detector elements.

* * * * *